Dec. 8, 1964   G. MUSAPHIA   3,159,936
ANIMATED DISPLAYS
Filed Sept. 23, 1959   3 Sheets-Sheet 1

INVENTOR.
Georges Musaphia.
BY
Le Roy J. Leishman
Agent

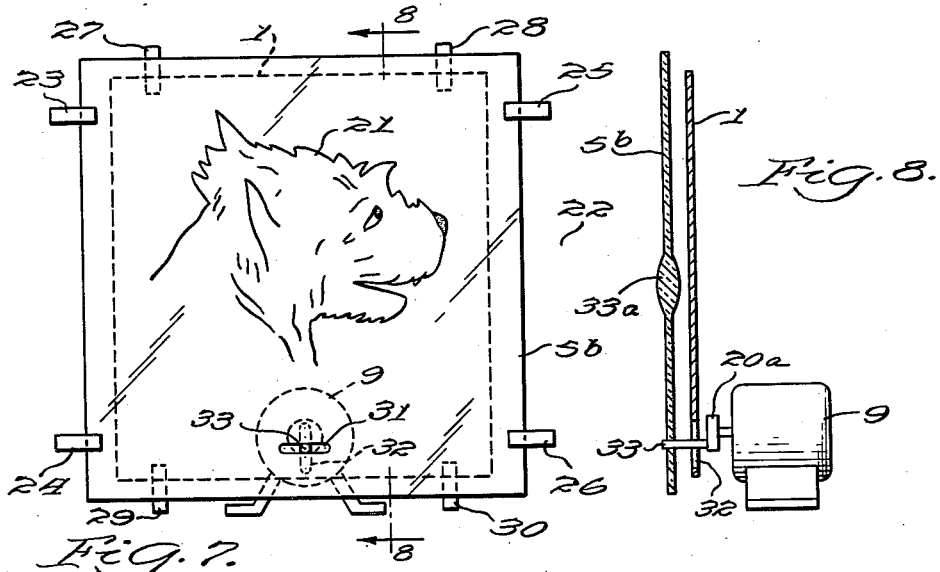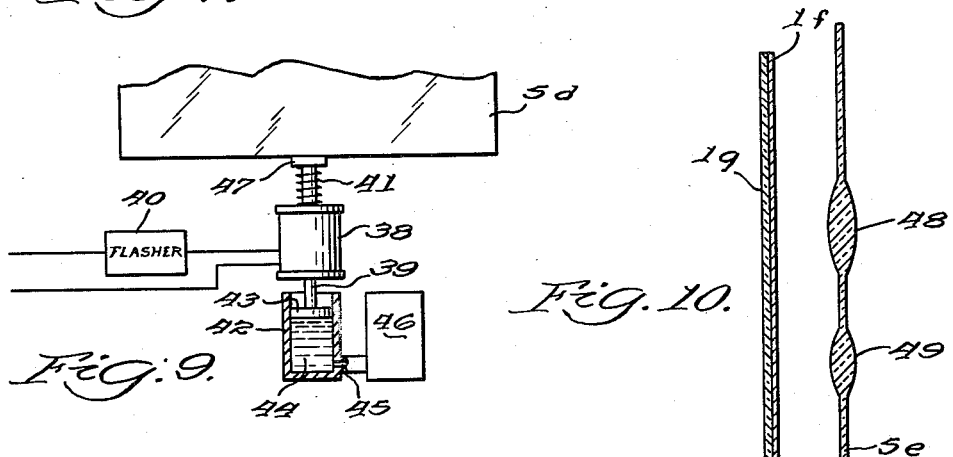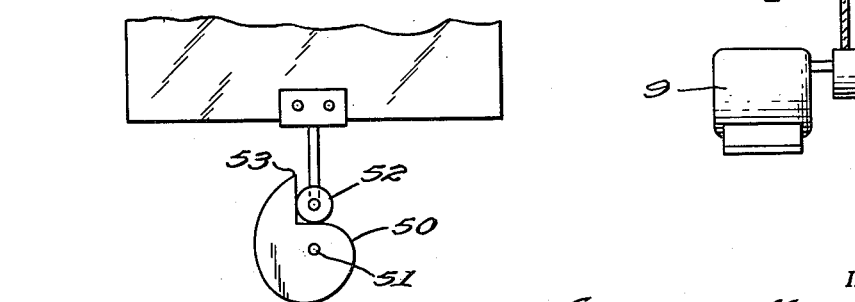

Dec. 8, 1964    G. MUSAPHIA    3,159,936
ANIMATED DISPLAYS
Filed Sept. 23, 1959    3 Sheets-Sheet 3

INVENTOR.
GEORGES MUSAPHIA
BY
Ezekiel Wolf, Wolf, & Greenfield
attys ated Dec. 8, 1964

3,159,936
ANIMATED DISPLAYS
Georges Musaphia, 24 Belmont St., Newton, Mass.
Filed Sept. 23, 1959, Ser. No. 843,612
1 Claim. (Cl. 40—106.53)

This application relates to animated displays and is a continuation-in-part of my earlier application Serial No. 551,354, filed December 6, 1955, now abandoned.

It has been very difficult in the past to provide an animated display in which images, or portions of images, appear to move particularly in the plane of the image without involving such expense that it becomes prohibitive to most advertisers. Pictures projected from film have been employed for this purpose, as well as devices in which different positions of the image have been arranged in alternate vertical strips over which vertical grids or lenticulations have been superimposed. One of the objects of the present invention is to produce an animated image without the use of moving films and without any type of grid or lenticulation.

Another object is to produce animation of three dimensional figures as well as those having two dimensions.

Another object is the provision of a display of the type hereinbefore mentioned in which the image may be illuminated either from in front or behind, by illuminators expressly provided for the purpose within the device itself or outside thereof, or by light that may be available from sources not provided for the device, as, for instance by daylight coming through a window.

Still another object of my invention is the provision of a device of the class hereinbefore mentioned in which the image is animated by the simple movement of one or more transparent or translucent plates.

An additional object is the provision of simple means for moving the said plate or plates.

Still other objects will appear as the specification proceeds.

In the drawings:

FIG. 7 is a front view of the operating parts of another form of my invention.

FIG. 8 is a longitudinal section of some of the parts of the device of FIG. 7 taken on line 8—8.

FIG. 9 is an illustration of another means of moving an operating plate for my device, this means comprising a solenoid and dash pot.

FIG. 10 not only illustrates mechanism for imparting motion to two different portions of an image, but also an arrangement wherein a translucent image is mounted upon a transparent backing.

FIG. 11 is an illustration of yet another means of imparting motion to an animating plate such as required for my device.

Figure 12:
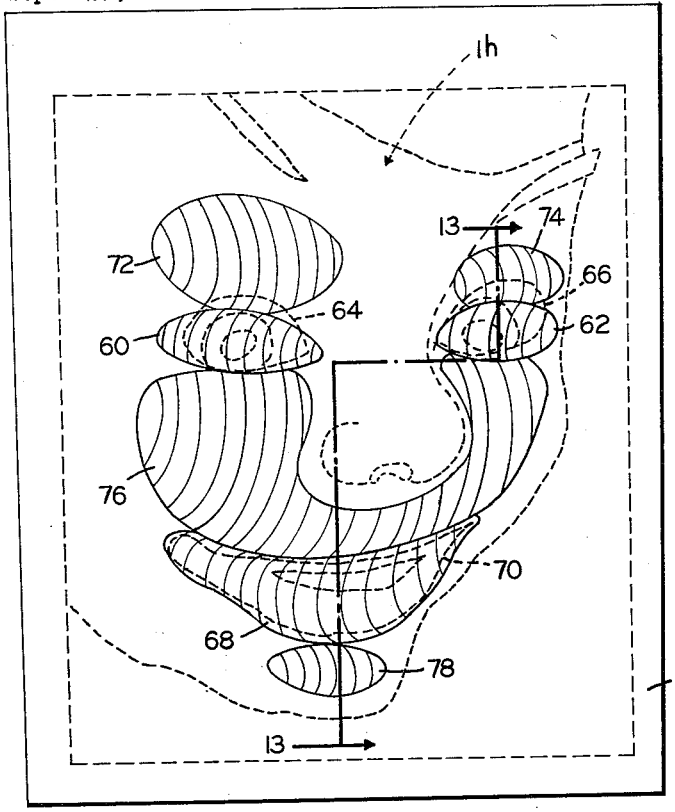

FIG. 12 is an elevation view of a portion of a display device including an image and plate disposed in front of the image for producing a more complex animation of the image.

Figure 13:
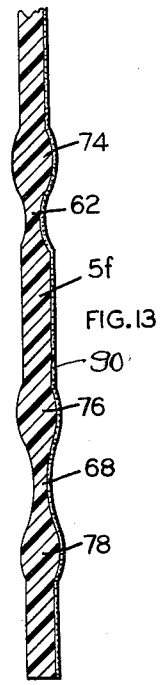

FIG. 13 is a cross sectional view taken on the line 13—13 of the plate in FIG. 12.

Figure 14:
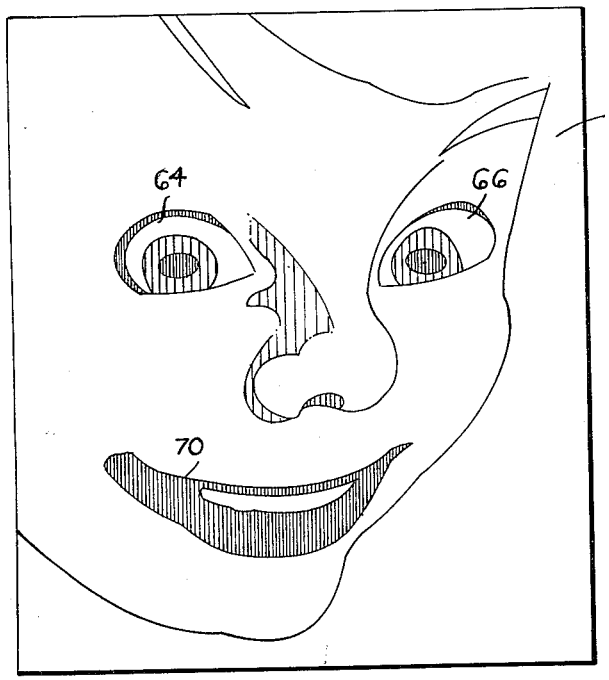

FIG. 14 is a view of the image disposed behind the plate in FIG. 12.

Figure 2:
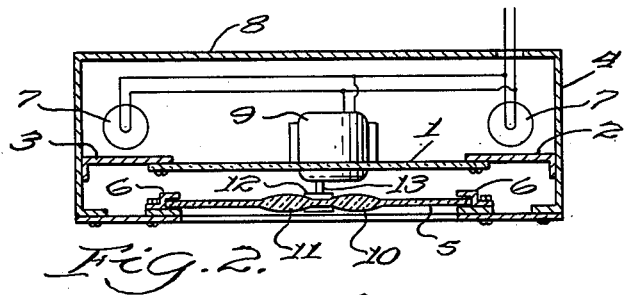
FIG. 2 is a cross-section taken on line 2—2 of FIG. 1.
Figure 1:
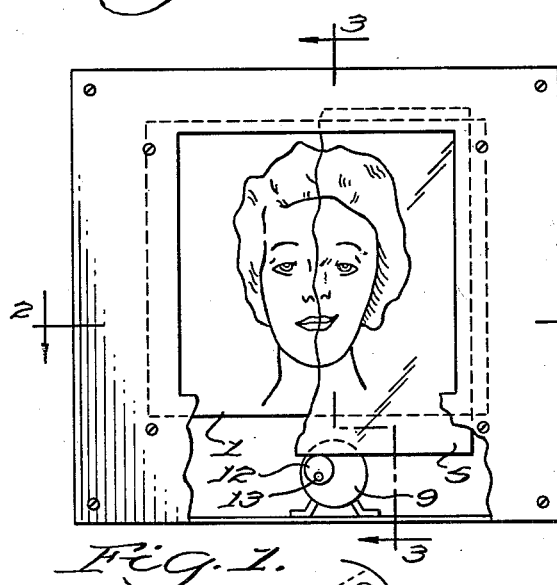
FIG. 1 is a front view, partly broken away, of a device embodying my invention.
Figure 3:
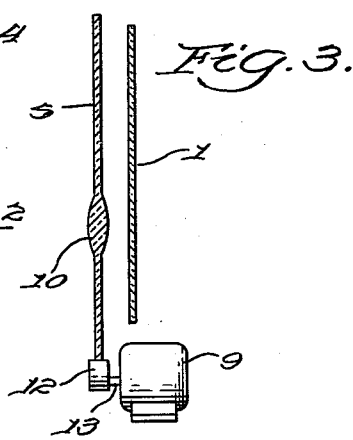
FIG. 3 is a fragmentary section taken generally along line 3—3 of FIG. 1.

In the embodiment illustrated in FIGS. 1, 2, and 3, a translucent image 1 is supported by suitable means, such as brackets 2 and 3, in a housing 4. A translucent animating plate 5 is mounted for reciprocal movement by any convenient means, such as the ways 6 shown in FIG. 2. Lamps 7 illuminate the space or area between the image 1 and the back 8 of the case. Lamps 7 may be electric lamps, as indicated in FIG. 2, where the motor 9 is shown connected in parallel with both of the lamps.

The plate 5 must be especially made for the animation of the particular image that is to be used. In the embodiment shown in FIGS. 1, 2, and 3 the object is to make a smile appear on the face. Accordingly, the transparent plate is provided with 2 sections 10 and 11 wherein the opposite sides of the transparent plate bulge outwardly, thus producing convex sections. These sections must be so located that they will be superimposed substantially over the portion of the image that is to move. Accordingly, the convex section 10 is shown in FIG. 3 in a position in which it will lie directly over a portion of the lips on the right side of the image as well as over an adjacent portion of the cheek. The other section 11 in which the opposed sides of the transparent plate have non-parallel surfaces, is disposed in a similar manner over the opposite side of the mouth. Thus, the image or portion thereof to be animated is effectively reproduced in the plate 5 in outline form and in the projected area of the portion of the image to be animated.

In order to animate the image so that the face moves into a smile, it is necessary that the transparent plate 5 be moved upwardly. This movement may be effected in a variety of ways, the specific means being immaterial. For purposes of illustration, however, the motor 9 has been included in these figures, and the motor is assumed to be equipped with a speed reducing means of any suitable type, many such arrangements being provided commercially in the same housing as the motor. An eccentrically mounted wheel 12 is shown attached to the shaft 13 of the motor. Gravity holds the transparent plate 5 against the periphery of the eccentric 12. When the plate 5 is in its lowermost position it is so disposed with respect to the image that no smile appears. The observer sees the image as it is shown on the left side of FIG. 1. As the eccentric rotates to the position shown in FIGS. 1 and 3, the upward movement of the section 10 so changes the angles of incidence and refraction that the sides of the mouth appear to move upwardly as indicated on the left side of the image in FIG. 1. As the plate 5 again moves downwardly in response to further rotation of the eccentric 12, the smile disappears.

Figure 5:
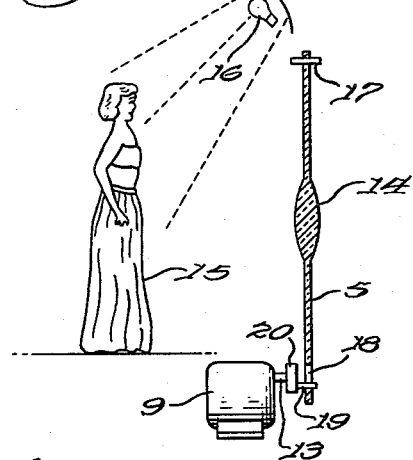
FIG. 5 illustrates another embodiment of my invention in which a three dimensional image is used. It also illustrates front illumination as applied to either two-dimensional or three-dimensional images.
Figure 6:
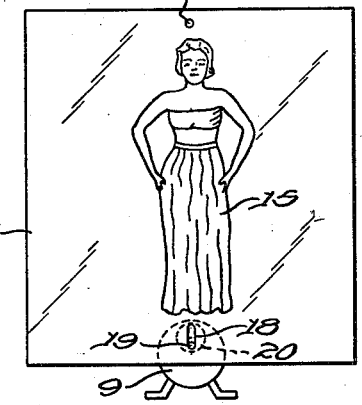
FIG. 6 is a front view of most of the device of FIG. 5.

It will readily be understood that such sections as 10 and 11, in which the surfaces of the plate depart from the parallelism that characterizes the greater part of the plate's surfaces, may be shaped and located so as to create apparent movement of any portion of the image that it is desired to animate. FIGS. 5 and 6, in fact, disclose another illustrative embodiment in which the section 14 is made to move sideways, thus imparting a lateral movement to the hip section of the dancing figure 15. If it was desired to impart motion to the arms, shoulders, or head of the image, the plate 5 necessarily would have to be formed to include curved surfaces opposite those areas on the image. That is, the plate 5 would have non-parallel surfaces in the portion thereof coincident with the projected area of the portion of the image to be animated. In FIGS. 5 and 6, the image is three-dimensional. It is illuminated by the lamp 16. Any suitable means for imparting reciprocal lateral movement will of course suffice. In FIGS. 5 and 6, the transparent plate 5 is shown pivoted on a shaft 17 and is provided with a vertical slot 18 into which projects an eccentrically mounted pin 19 carried by wheel 20 on the shaft 13 of the motor 9. As the pin 19 describes a circle, it oscillates the plate 5 about the pivot 17 and lateral movement is imparted to the hips and hands of the dancing figure.

FIGS. 7 and 8 illustrate an embodiment in which both the transparent plate and the translucent image are movable. If this display is associated with a suitable means to produce a sound resembling a bark, the dog's head 21 can be made to move laterally in the direction of the arrow 22 as the mouth opens simultaneously with the emission of the sound. The front transparent animating plate 5b is mounted for reciprocal movement in a vertical direction in ways 23, 24, 25 and 26, while the image plate 1 is mounted for lateral movement in ways 27, 28, 29 and 30.

In order to move plates 5 and 1 vertically and laterally respectively, plate 5 is provided with a horizontal slot 31 and plate 1 with a vertical slot 32. The eccentrically mounted pin 33 carried by wheel 20a on the shaft of motor 9, protrudes through both slots 31 and 32, and as the pin 33 rotates in a circle, a lateral reciprocal motion is imparted to the image plate 1 and a vertical reciprocal motion to the transparent plate 5. Inasmuch as the non-parallel surfaces of section 33a of plate 5b lies in the projected area of the lower jaw of the dog's head, the jaw will appear to move and the mouth to open; and the lateral movement of the image plate 1 will of course impart actual lateral movement to the head.

Figure 4:
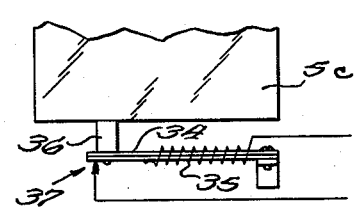
FIG. 4 is a schematic illustration of a different means of moving one of the operating sheets of my device than is shown in the previously mentioned figures.

FIGS. 4, 9 and 11 illustrate alternative arrangements for moving either the imagine plate or the animating plate that controls the angles of incidence and refraction of the light rays from the image plate. In FIG. 4, the bimetallic member 34 is surrounded by a resistance element 35 which is connected in an electric circuit as indicated in the figure. As the bimetallic element becomes heated, it moves the stud 36 upwardly, thus raising the transparent plate 5c. As the circuit is broken at contact 37, the bimetallic element finally cools, permitting the plate 5c to drop down under its own weight. Connection is ultimately restored at 37 and the same cycle of operation continues to repeat.

In FIG. 9, the vertical movement of the plate 5d is controlled by a solenoid 38 which is provided with a suitable plunger 39. When the coil of the solenoid is energized by the flasher 40, the plunger 39 is moved downwardly against the action of the expansion spring 41. The speed of downward movement, however, is controlled by the dash pot 42 in which a piston 43 must move the fluid 44 through an orifice 45 into chamber 46 as it is moved downwardly. This materially slows down the movement of the plunger 39. When the coil of the solenoid 38 is de-energized, the plunger moves upwardly under action of the spring 41 which expands between the top of the solenoid and the flange 47. The plunger, however, can move upwardly no faster than the piston 43 sucks the fluid back into the cylinder 42. No claim is made to this particular means for moving the transparent plate 5d, and such means is illustrated and described solely for the purpose of showing that any of a large variety of means for producing reciprocal motion may be employed for moving either the transparent plate or the image plate.

FIG. 10 illustrates modifications that may be made in the embodiments hereinbefore explained. The transparent plate 5e, like the transparent plate 5 of FIG. 2, is shown as having two portions in which the sides depart from parallelism. In FIG. 10, these sections are designated by the numerals 48 and 49 respectively. In FIG. 10, however, these sections that bend the light rays are shown in vertical alignment, whereas they are substantially in horizontal alignment in FIG. 2. There may of course be any number of sections of the transparent plate having non-parallel sides, and their location will depend upon what portions of the image are to be given apparent motion.

FIG. 10 also shows an arrangement in which the image is not formed directly on or in a self-supporting plate. The translucent image plate 1f is shown in this figure as attached to a transparent sheet 1g. It will of course be understood that any means hereinbefore described or any other suitable means, may be used to impart apparent motion to two-dimensional as well as three-dimensional images; that such images may be opaque, transparent or translucent; and that they may also be self-supporting or supported in any convenient manner.

In FIGS. 12–14 I have illustrated in detail a display employing a plate which effects a relatively complex animation of an image. The plate includes several concave as well as convex sections to animate the boy's face shown in FIG. 14 and in outline form in FIG. 12. The object of the plate is to animate the eyes and mouth of the face as well as their surrounding areas. In detail, the plate 5f lies immediately in front of image 1h and includes concave sections 60 and 62 formed in the projected area of the eyes 64 and 66, excluding the uppermost portions of the eyes. A large concave section 68 formed in the plate 5f lies in the projected area of the mouth 70 of the face, and convex sections 72 and 74 overlie the uppermost portions of the eyes and the immediately adjacent portions of the brow. Still another large convex section 76 overlies the projected area of portions of the cheeks of the face as well as the area between the upper lip and nose of the image, and an additional convex section 78 overlies the central portion of the chin. Thus, in effect, the eyes, brow, cheeks, mouth, and chin of the image are sculptured in outline form into the lens.

With the plate 5f in the position shown in FIG. 12, the concave section 68 narrows the lips of the mouth of the face and reduces their separation when the image is viewed through the plate. In this position, the plate 5f and more particularly its convex sections 72 and 74 enlarge slightly the upper portions of the eyes 64 and 66 while the concave sections 60 and 62 generally reduce the major portion of the eye openings. As the plate moves downwardly under the control of cam 9 (see FIG. 1) or under the control of any of the other actuators illustrated and described, the eyes will open wider as the convex sections 72 and 74 replace the concave sections 60 and 62 in the projected area of the eyes. This animation will lead slightly the enlargement of the mouth including the thickness of the lips and their separation caused by the replacement of the concave section 68 by the convex section 76 in the projected area of the mouth. It will be recognized that the areas surrounding the mouth and the eyes will be animated also to avoid unnatural distortions of the face. The continued oscillatory motion imparted to the plate 5f as suggested by the arrow 80 will animate the face between the mild smile and a very hearty smile, the eyes growing larger as the intensity of the smile increases. In FIG. 12, the cam 9 or other actuator would be so positioned that the plate 5f will lie in the position shown at the top of its course and the plate will be allowed to fall to a position wherein the convex sections 72 and 74 fully overlie the eyes 64 and 66.

In those embodiments of my invention having a flat or two-dimensional image, the effect of the display may be enhanced by using a transparent plate with a translucent coating on its outer surface of non-uniform color. If the portion of the plate overlying the central portion of the image has a light colored translucent coating and the color of the coating gradually darkens in the direction of the periphery of the image, the image when viewed through the plate will appear to be three-dimensional. Thus, if the central portion of the plate 5 in FIG. 1 overlying the nose and inside portions of the cheeks has a white coating and the portions of the plate surrounding the white section has a darker coating, reaching a dark blue or black in the projected area of the periphery of the image, the face will appear to be three-dimensional when viewed through the plate. The translucent coating 90 on the surface of the plate 5f in FIGURE 13 is so colored to render the desired effects.

FIG. 11 shows yet another method of imparting motion to either the image or refraction plate, or both. In this case a spiral shaped cam 50 is mounted upon the rotatable shaft 51. As the cam 50 rotates in a counter-clockwise direction, it raises the follower 52 until the point 53 of the cam passes beyond the follower. The follower then drops again to the position shown in the figure. Such an arrangement causes the image plate to raise slowly and to drop rapidly, thus slowly moving a portion of the image and rapidly restoring it to its original position.

The embodiments shown and described are merely illustrative, and it will be understood that various other modifications, substitutions and additions may be made without departing from the broad spirit of my invention as set forth in the appended claim.

I claim:

In a display device, a two dimensional illustrated image having a portion to be animated in the plane of the image, a transparent plate having generally parallel surfaces mounted parallel and in close proximity to said image, said plate having a translucent coating on its outer surface, said coating being light colored in its portion overlying the central portion of the image and darker colored in its portion overyling the periphery of the image, said plate in the area defined by the projected area of said portion of the image thereon having front and rear surfaces which depart from parallelism, and means for moving said plate through a cycle of positions for varying the angles of incidence and refraction of light rays passing through said area in the plate from the portion of the image to be animated.

References Cited by the Examiner

UNITED STATES PATENTS

| | | |
|---|---|---|
| 521,064 | Vander Weyde | June 5, 1894 |
| 1,832,739 | Del Riccio | Nov. 17, 1931 |
| 2,087,658 | Shively | July 20, 1937 |
| 2,189,568 | Miller | Feb. 6, 1940 |
| 2,204,435 | Musaphia | June 11, 1940 |
| 2,371,172 | Hotchner | Mar. 13, 1945 |
| 2,586,231 | Hotchner | Feb. 19, 1952 |
| 2,999,326 | Musaphia | Sept. 12, 1961 |

FOREIGN PATENTS

| | | |
|---|---|---|
| 240,993 | Great Britain | Oct. 15, 1925 |